June 8, 1937.  J. M. NAUL  2,083,343
CUT-OUT SWITCH FOR ELECTRIC MOTORS
Filed May 14, 1935  2 Sheets-Sheet 2

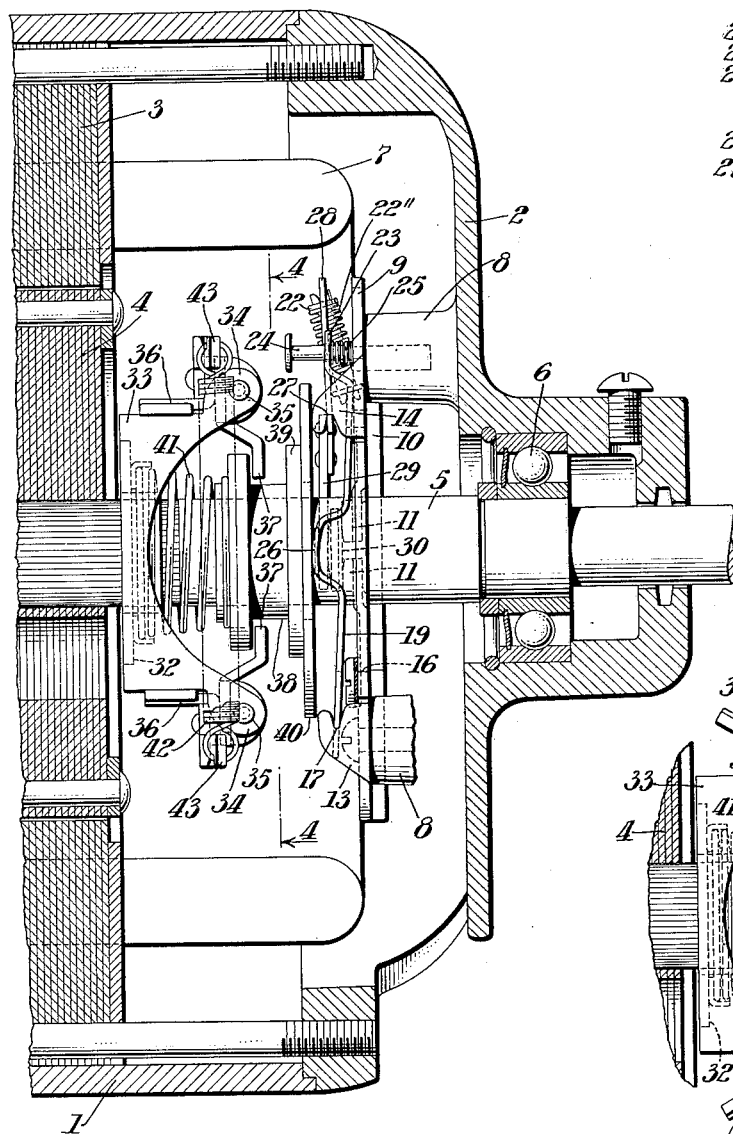
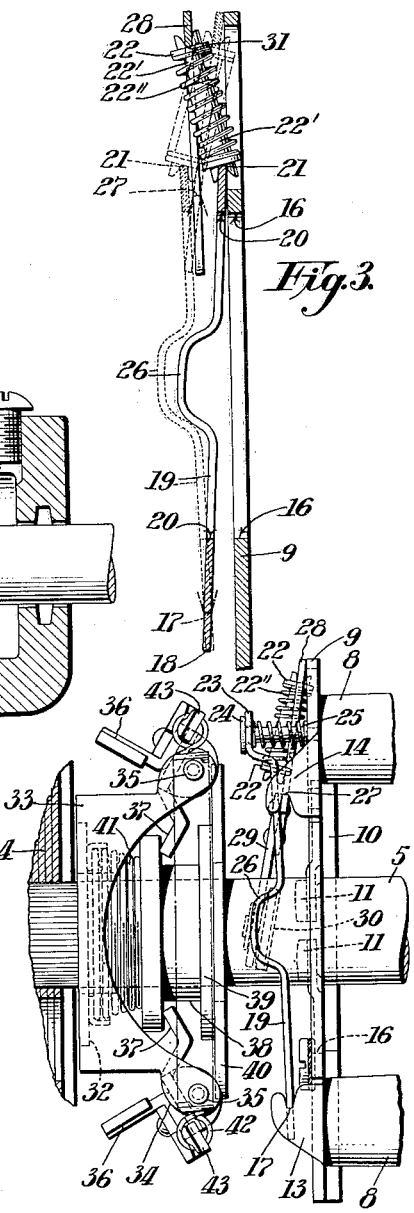
Fig.1.
Fig.2.
Fig.3.
Inventor
James M. Naul

Inventor
James M. Naul
By Henry J. Miller
Attorney

Witness:
Godfrey Peine

Patented June 8, 1937

2,083,343

UNITED STATES PATENT OFFICE 2,083,343

CUT-OUT SWITCH FOR ELECTRIC MOTORS

James M. Naul, Fanwood, N. J., assignor to The Singer Manufacturing Company, Elizabeth, N. J., a corporation of New Jersey Application May 14, 1935, Serial No. 21,355

2 Claims. (Cl. 200—67)

This invention relates to electric motors and more particularly to alternating current motors having stationary exciting windings which require switching provisions in connection therewith to meet starting and running requirements of the windings. For example, there is a type of single phase electric motor, known as a split-phase motor, having on its stator a running winding and a starting winding at an electrical angle to the running winding. When the motor is at rest both windings are connected in parallel and are so designed that when connected to the power line the currents flowing in the two windings are out of phase and produce the rotating magnetic field necessary to start the motor. After the motor has been started it is necessary to cut out or open the circuit through the starting winding to prevent the latter from burning out, as it is normally designed to safely carry its starting current for a few seconds only.

The present invention has for an object to produce a centrifugal motor-circuit-controlling switch of simple, durable and inexpensive construction which will operate automatically and quickly to open and close the motor-winding circuit controlled thereby and which will not flutter indecisively or chatter at any speed of the motor. A further object of the invention is to provide a switch of the class described having minimum space requirements for its installation and operation within the motor.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

Figure 4:
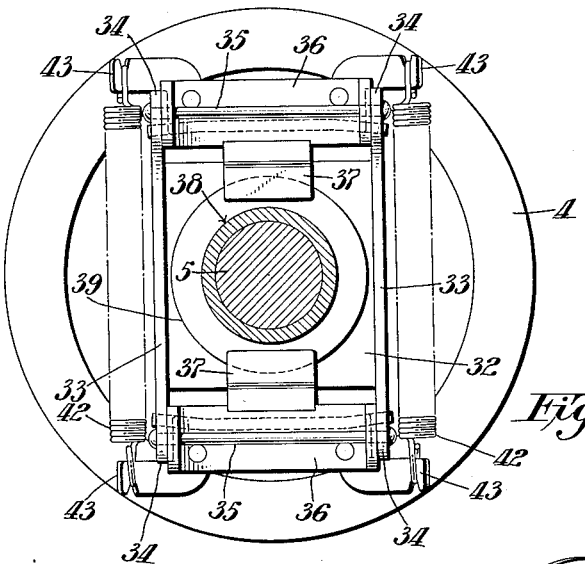
Figure 5:
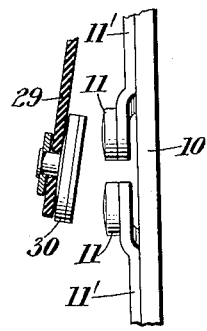
Figures 6, 7:
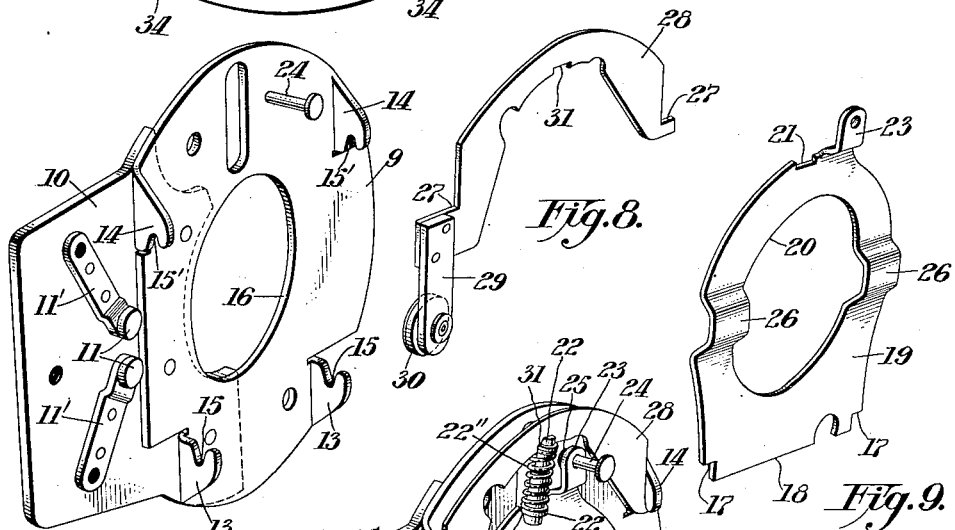
Figure 8:
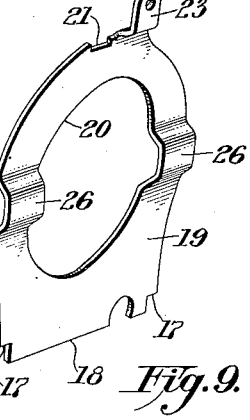
Figure 9:
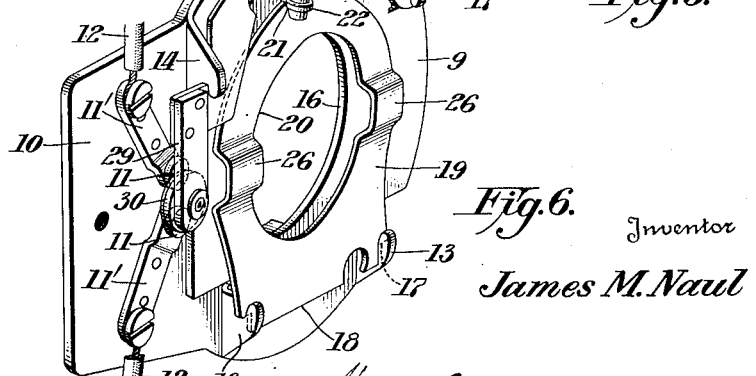

In the accompanying drawings Fig. 1 is a section through one end of an electric motor fitted with a switch embodying the invention, the switch-contacts being closed as when the motor shaft is stationary. Fig. 2 is a similar view of the switch with the contacts open as when the motor shaft is running at normal speed. Fig. 3 is a sectional view of the toggle-elements of the switch. Fig. 4 is a section on the line 4—4, Fig. 1. Fig. 5 is a view of the switch contact elements. Fig. 6 is a perspective view of the switch. Fig. 7 is a perspective view of the switch base and Figs. 8 and 9 are perspective views of certain lever elements of the switch.

In the specific embodiment of the invention illustrated, 1 represents the casing and 2 one of the end-bonnets of a single-phase alternating current electric motor having a stator 3 and a rotor 4 carried by the motor-shaft 5 journaled at one end in the bearing 6 in the end-bonnet 2. The stator is energized by the usual running and starting windings indicated collectively at 7, the latter of which requires to be open-circuited as the motor comes up to speed.

Mounted on pillars 8 projecting inwardly from the motor end-bonnet 2 is the sheet-metal switch-base 9 having riveted thereto a sheet of stiff insulating material 10 upon which are mounted in spaced relation the stationary terminal plates 11' carrying the contacts 11 and connected in the starting winding circuit by the leads 12, Fig. 6.

The switch base 9 has bent up from the plane thereof a pair of spaced lower ears 13 and a pair of spaced upper ears 14 which ears are formed with opposed fulcrum notches 15, 15', Fig. 7. The switch base 9 has a central aperture 16 to clear the motor shaft 5.

Resting in the fulcrum notches 15 in the lower pair of ears 13 are the fulcrum edges 17, defined by corner notches at the ends of the base edge 18 of a sheet-metal toggle-actuating lever 19 having an aperture 20 to clear the motor-shaft 5. The lever 19 is formed at its upper end with a notch 21 in which is rockably seated the lower notched end of an endwise expansible toggle-thrust member 22. The lever 19 is formed adjacent the notch 21 with an apertured ear 23 loosely embracing the stationary headed guide-pin 24 which is fixed to the base 9. A coiled spring 25 surrounds the pin 24 between the ear 23 and the base 9 and yieldingly urges the ear 23 toward the head of the pin 24 which functions as a stop. The lever 19 is formed with the diametrically opposed humps 26 which are engaged at times by the centrifugal or speed-responsive mechanism to be described.

Seated in the notches 15' of the upper pair of ears 14 are the fulcrum edges 27 at the ends of the arched or U-shaped toggle-operated lever 28 to one end of which is riveted a piece of stiff insulating material 29 loosely carrying the bridging contact button 30 which may tilt slightly relative to its supporting arm 29 and which, at times, engages the spaced stationary contacts 11. The toggle-operated lever 28 is formed with a centrally disposed notch 31 in which is rockably seated the notched upper end of the expansible toggle-thrust-member 22 which removably retains both levers 19 and 28 seated in their respective fulcrum notches 15, 15'.

As shown in Fig. 3, the toggle-thrust-member 22 comprises two telescoped and headed rods 22' surrounded by a coiled spring 22".

The edge of the notch 21 in the lever 19 is disposed above a line connecting the notches 15' in the upper ears 14, so that movement of the lever 19 in either direction about its fulcrum edges 17 will first compress the toggle-thrust-element 22 until such element crosses the plane of the toggle-operated lever 28, whereupon the lever 28 will be suddenly and decisively shifted to its opposite extreme position about its fulcrum edges 27. It will be understood that, in one extreme position of the lever 28, the movable contact button 30 engages the stationary contacts 11 and closes the circuit through the starting winding of the motor. In the other extreme position of the lever 28 the button 30 is widely separated from the stationary contacts 11.

The speed-responsive mechanism may comprise a base 32 fast on the motor-shaft and formed with side cheek pieces 33 having ears 34 supporting the parallel pivot-pins 35 for the weighted levers 36 having inwardly extending arms 37 entering the groove 38 in the collar 39 slidable on the motor-shaft. The collar 39 carries at one end a fiber head 40 which, at times, engages the humps 20 of the toggle-lever 19. A spring 41 is disposed between the base 32 and the collar 39. This spring is strong enough to overpower the spring 25 and force the lever 19 to the position shown in Figs. 1 and 6 as the motor slows down. Coiled springs 42 are stretched between the arms 43, 43 of the weighted levers 36 and resist the centrifugal expansive forces set up in the weighted levers.

When the motor is started and the speed of the shaft 5 increases beyond a predetermined value, the centrifugal forces set up in the weighted levers 36 overcome the resistance of the springs 41 and 42 and the collar 39 is withdrawn from engagement with the lever 19 which is shifted by the spring 25 to the extreme position shown in Fig. 2.

The foregoing specification is to be read in an illustrative sense and not in limitation of the invention; it being understood that various modifications may be made in the details of construction and relative arrangements of parts shown and described within the spirit and scope of the invention.

Having thus set forth the nature of the invention, what I claim herein is:—

1. In a toggle switch, a base-plate adapted for mounting at the inner side of a motor end-bonnet, a toggle-lever fulcrumed at one end on said base and having a clearance aperture for the motor-shaft, a U-shaped toggle-operated lever fulcrumed at the ends of its legs on said base, an endwise spring expansible toggle-thrust-member rockably reacting at its opposite ends against said toggle-lever and the central portion of said U-shaped toggle-operated lever, a movable contact carried by said toggle-operated lever, and a stationary contact carried by said base.

2. In a snap-switch, the combination with a flat base having two pairs of notched ears projecting from the same side of and standing at an angle to the plane of said base, the notches of each pair of ears opening in a direction toward the other pair of ears, a flat toggle-actuating lever fulcrumed in the notches of one pair of ears, a flat-toggle-actuated lever fulcrumed in the notches of the other pair of ears, a spring-expansible toggle-thrust-member between and rockably connected to each of said levers, and a movable contact carried by said toggle-actuated lever.

JAMES M. NAUL.